United States Patent [19]

Weihe et al.

[11] Patent Number: 4,911,284
[45] Date of Patent: Mar. 27, 1990

[54] WHISKER DRIVEN CONVEYOR SYSTEM

[75] Inventors: Clyde R. Weihe, Needham Heights; Henry V. Martin, Acushnet, both of Mass.

[73] Assignee: Den Mar Corporation, North Dartmouth, Mass.

[21] Appl. No.: 399,310

[22] Filed: Aug. 28, 1989

Related U.S. Application Data

[63] Continuation-in-part of Ser. No. 390,738, Aug. 8, 1989, which is a continuation of Ser. No. 63,145, Jun. 16, 1987, abandoned.

[51] Int. Cl.$^4$ .............................................. B65G 39/00
[52] U.S. Cl. .................................. 198/465.1; 198/780; 198/781; 193/37
[58] Field of Search ............ 198/780, 781, 783, 465.1, 198/803.01; 193/35 R, 37

[56] References Cited

U.S. PATENT DOCUMENTS

| | | | |
|---|---|---|---|
| 2,099,221 | 11/1937 | Paxton | 198/780 X |
| 3,087,599 | 4/1963 | Nelson | 198/780 |
| 4,088,221 | 5/1978 | Bowser | 198/780 X |
| 4,331,228 | 5/1982 | Galarowic | 198/781 X |

FOREIGN PATENT DOCUMENTS 0177818 10/1983 Japan ................................. 198/781

Primary Examiner—Frank E. Werner
Assistant Examiner—D. Glenn Dayoan
Attorney, Agent, or Firm—M. Lawrence Oliverio

[57] ABSTRACT

A conveyor apparatus for trays or the like comprising a framework for supporting a conveyor path along which the trays are to be conveyed; the framework having side rails for aligning the trays in a uniform orientation along the path of the apparatus; a plurality of freely rotating rollers mounted on the framework between the side rails; the rollers being mounted on the framework in serial spaced relationship such that the uppermost tangential surfaces of successive rollers lie in a continuous plane defining a support surface for the trays; a plurality of wheels mounted to the framework between the rails, the wheels having whiskers protruding from the circumference thereof; the whiskers being bendable from a position in which the whiskers normally protrude from the wheels and resiliently reformable back to the position in which the whiskers normally protrude; the wheels being mounted serially along the length of the conveyor path and between the rollers such that the whiskers extend above the continuous plane in which the uppermost surfaces of the rollers lie; the wheels being drivably rotatable such that the whiskers rotate and define a direction of travel for the trays; and the whiskers on a wheel contacting the underside surface of a tray traveling past a wheel and bending upon said contact, the whiskers exerting frictional force on a contacted tray and moving a contacted tray forward in the direction of travel defined by the rotatably driven wheels.

8 Claims, 2 Drawing Sheets

WHISKER DRIVEN CONVEYOR SYSTEM

This is a continuation-in-part application of application Ser. no. 07/390,738 filed Aug. 8, 1989 which is a file wrapper continuation of application Ser. no. 063,145 filed June 16, 1987 for a Conveyor System now abandoned.

BACKGROUND OF THE INVENTION

The present invention relates to conveying apparati and more particularly, to conveying apparati for automatically transporting trays as are typically used in food service establishments such as restaurants, cafeterias and the like.

SUMMARY OF THE INVENTION

Conveyor apparati utilizing rollers have been known and used in the past for transporting objects along a pre-selected path of transport. Complex mechanisms have been developed for slowing down or stopping objects which are being transported along the rollers. Such mechanisms are typically cumbersome and include complex drive mechanisms, stop/start mechanisms and the like.

In particular, conveying systems for receiving and transporting cafeteria dishes, trays and the like have been developed such as illustrated in U.S. Pat. Nos. 3,117,668, 3,237,755, 4,410,081, 1,816,327.

Other apparati relating to conveying and components thereof are disclosed in U.S. Pat. Nos. 4,458,806 (Weihe et al.); 4,281,756 (Bruno); 4,227,607 (Malavenda); 3,511,360 (Jagiel); 3,507,380 (Sarovich et al.); 1,816,327 (Hise).

It is an object of the present invention to provide an elegant, efficient conveyor system for continuously moving objects.

In accordance with the invention there is provided a conveyor apparatus for trays or the like comprising a framework for supporting a conveyor path along which the trays are to be conveyed; the framework having side rails for aligning the trays in a uniform orientation along the path of the apparatus; a plurality of freely rotating rollers mounted on the framework between the side rails; the rollers being mounted on the framework in serial spaced relationship such that the uppermost tangential surfaces of successive rollers lie in a continuous plane defining a support surface for the trays; a plurality of wheels mounted to the framework between the rails, the wheels having whiskers protruding from the circumference thereof; the whiskers being bendable from a position in which the whiskers normally protrude from the wheels and resiliently reformable back to the position in which the whiskers normally protrude; the wheels being mounted serially along the length of the conveyor path and between the rollers such that the whiskers extend above the continuous plane in which the uppermost surfaces of the rollers lie; the wheels being drivably rotatable such that the whiskers rotate and define a direction of travel for the trays; and the whiskers on a wheel contacting the underside surface of a tray traveling past a wheel and bending upon said contact, the whiskers exerting frictional force on a contacted tray and moving a contacted tray forward in the direction of travel defined by the rotatably driven wheels.

Typically the whiskers extend only so far above the plane in which the support surface lies as to bend a degree upon contact with the underside of an overlying tray which is sufficient to create enough friction between the whiskers and the tray to move the trays forwardly upon drivable rotation of the wheels. The frame preferably includes a stop mechanism disposed in the conveyor path for stopping the movement of trays by interference upon reaching a selected position along the path.

The stiffness, resiliency and bendability of the whiskers are preferably selected to allow the whiskers to slide along the underside surface of a tray when the wheels are drivably rotated without forcing the trays forwardly when the trays are stopped by interference along the conveyor path. The trays are receivable on the supporting surface between the side rails, the trays having a certain width which is maintained substantially parallel to the axis of the conveyor path by interference with the side rails, the wheels being serially spaced along the length of the conveyor path such that the distance between successive wheels is less that the width of the trays.

Most preferably the apparatus further comprises a drive mechanism for rotating the wheel means; and a mechanism responsive to delivery of a tray to the apparatus for actuating the drive mechanism for a predetermined period of time. The mechanism for actuating the drive mechanism preferably includes a mechanism for actuating the drive mechanism for a period of time at least sufficient to move a tray as far along the length of the supporting apparatus as possible until the tray is stopped by interference.

The whiskers typically comprise a flexibly resilient polymeric material.

DETAILED DESCRIPTION OF PREFERRED EMBODIMENTS

Figure 1:
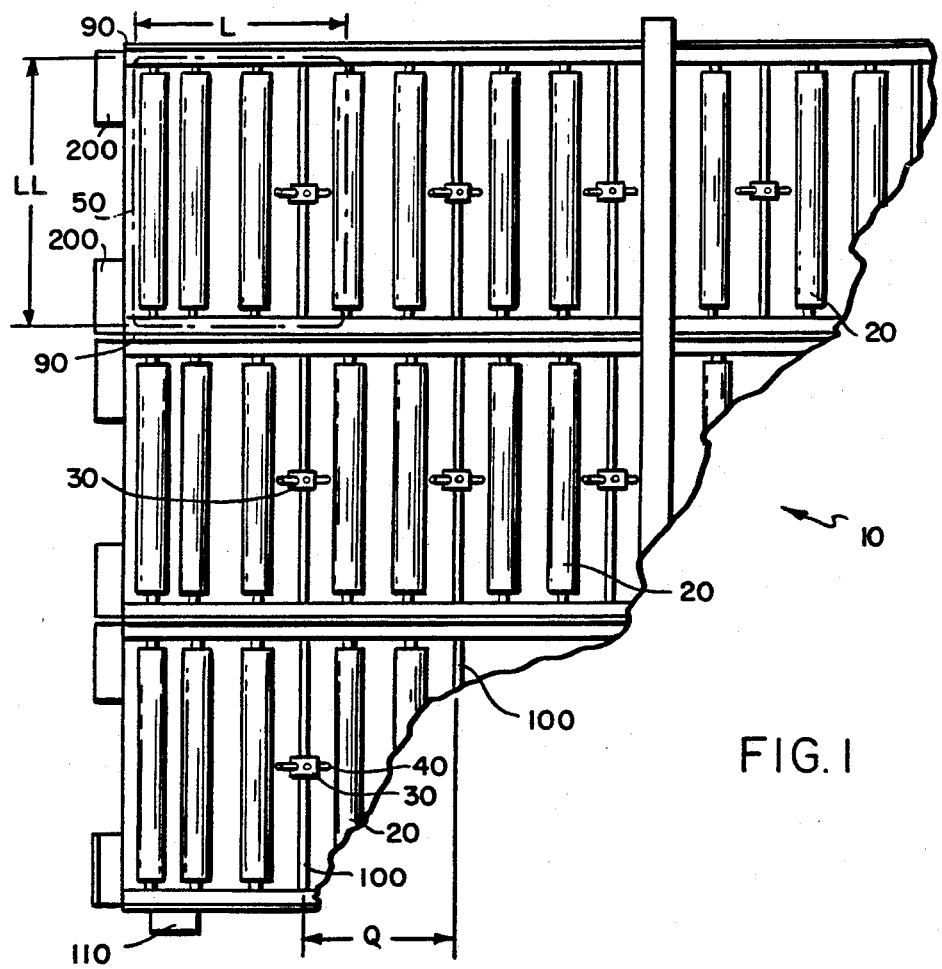
FIG. 1 is a top schematic view of a conveyor apparatus according to the invention.

FIG. 1 shows a top view of the end portion of a typical conveyor apparatus 10 according to the invention. In the embodiment shown in FIG. 1, the apparatus 10 comprises three side by side conveyor rows or paths mounted on a single frame. Each conveyor path comprises a serial array of cylindrical rollers 20 mounted on either end of each roller by conventional means, such as ball bearing means on the support framework such that the rollers 20 are freely rotatable around their axes.

Figure 2:
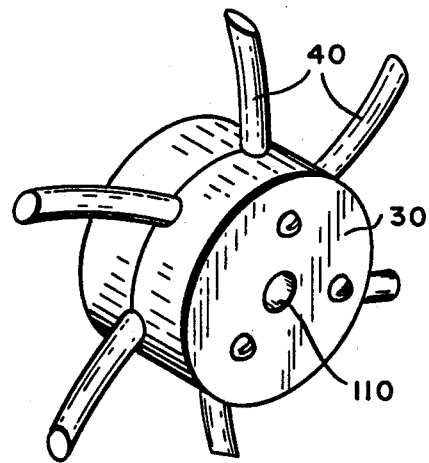
FIG. 2 is a side isometric view of a typical whisker wheel element useable in conjunction with the FIG. 1 apparatus.

Serially spaced by a distance Q between the freely rotating rollers 20 are mounted wheels 30 having whiskers 40 protruding outwardly from the circumference thereof, FIGS. 1, 2. Shown in dashed lines in FIG. 1 is the outline of a typical object 50 such as a tray resting on top of the rollers 20 at a position at the end of one of the conveyor paths. The tray 50 has a width L, FIG. 1, which is at least as large as the maximum spacing Q between successive whisker wheels 30. Typically, the maximum spacing Q between successive whisker wheels 30 is selected to be at least about one inch less than the width L of the object 50 to be conveyed on a conveyor path. More generally, the maximum spacing Q between successive wheels 30 is selected to be less than about 75% of the width of the bottom surface of the smallest object to be conveyed. In a typical implementation of the invention the objects to be conveyed on a conveying apparatus according to the invention are all of uniform dimension such as a plurality of uniformly sized rectangular or square dish trays having substantially the same top and bottom end length and width and depth, although as can be readily imagined, objects having substantially different widths such as L may be utilized on the same conveying apparatus as long as such varying widths are sufficiently greater than the spacing Q to enable conveying as described more fully below.

Figure 3:
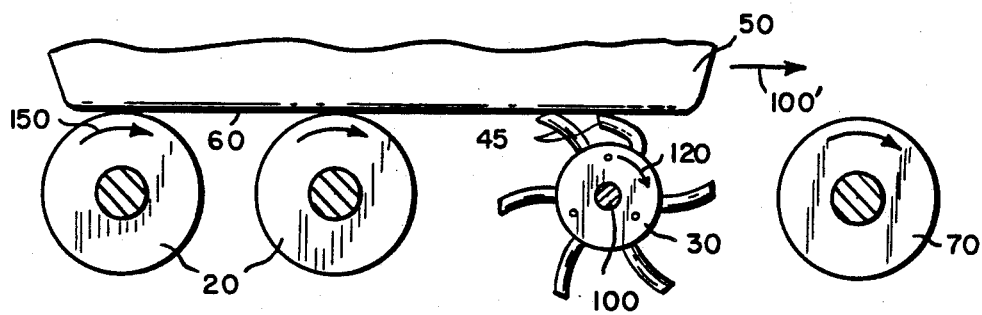
FIG. 3 is a side cross-sectional schematic view of the FIG. 1 apparatus showing whiskers on a whisker wheel element bending under the weight of a tray passing by the fixed position at which the whisker wheel is located along the length of the conveyor path.
Figure 4:
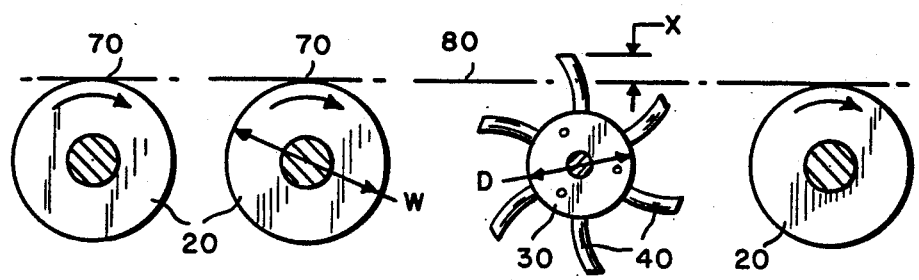
FIG. 4 is a side cross sectional schematic view of the FIG. 1 apparatus showing the positioning/extension of whiskers on a whisker wheel element relative to the surface which the bottom of an object follows along the conveyor path.
Figure 5:
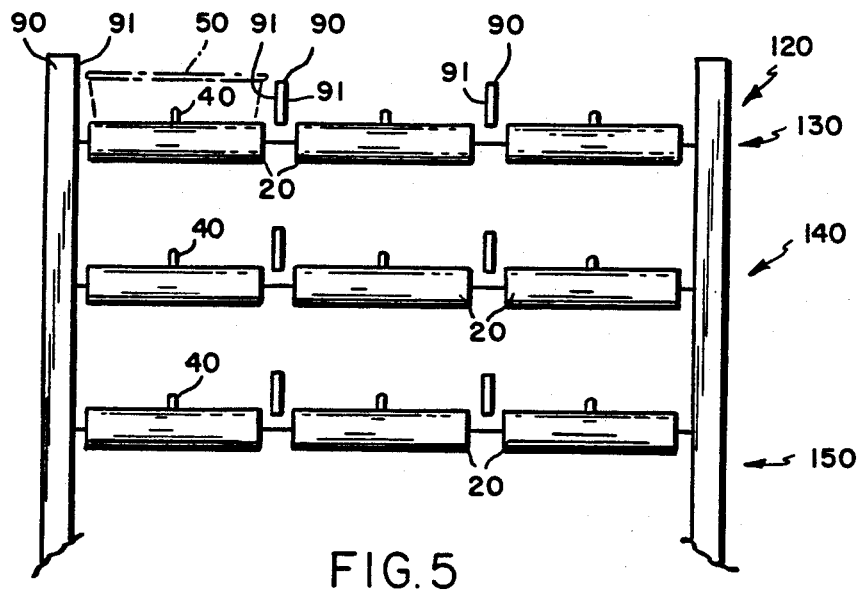
FIG. 5 is a front schematic view of the FIG. 1 apparatus showing a typical tiered set of rows of conveyors mounted on a single frame.

As shown in FIGS. 3–5, the object 50 to be conveyed preferably has a relatively flat underside surface 60 which sits on and is supported by the uppermost tangential surfaces 70 of rollers 20. The rollers 20 are mounted on the framework of the apparatus 10 such that the uppermost tangential surfaces 70 of successive rollers 20 all lie in a continuous plane defining a conveyor path 80 for the object(s) 50 to be conveyed. Although the portions of the conveyor paths specifically shown in FIGS. 1, 5, are straight, the apparati 10, 120 could be constructed so as to provide a curved or curvilinear conveyor path disposed in a substantially horizontal plane.

As shown in FIGS. 1, 5, each conveyor path is bordered by side rails 90. The side rails 90 have smooth inside surfaces 91 which oppose each other with respect to each separate conveyor path and are separated by a distance which is slightly greater than the length LL of the object 50 such that when the object 50 is received on the surfaces 70 of the rollers 20 between the rails 90, the inside surfaces 91 maintain the object(s) 50 aligned along the path 80 such that the width L of the object(s) 50 remain substantially parallel to the axis of the conveyor path during the course of movement 100, FIG. 3, of the object 50 along the top surfaces 70 of the rollers 20. Such relationship is best shown in FIG. 5 where it can be seen that the sides of the object 50 just fit between the inside surfaces 91 of rails 90 with a relatively small spacing therebetween, the maximum distance between an outermost side edge of an object 50 and the surfaces 91 preferably being less than about one inch. The side rails 90 preferably extend upwardly above the plane within which the conveyor path 80 lies at least as high as the outermost side edges of an object 50 extend, and, most preferably, the side rails 90 extend higher than the outermost side edges of an object 50 may extend above the level of the path 80. The side rails 90 typically comprise and/or are connected by conventional means to the main support framework of the apparati 10, 120, FIGS. 1, 5.

As can be readily imagined, where the object 50 is rectangular or square as illustrated in FIGS. 1, 5, the inside surfaces 91 will maintain the object 50 aligned along its length L with the axis of a conveyor path by virtue of the outermost side edges of the object 50 interfering with the surfaces 91 from time to time during travel 100 of the object 50, FIG. 3. The inside surfaces 91 are smooth and comprise a relatively low friction-creating material such as metal or plastic such that a minimum of friction may occur between the side edges of the object 50 and the surfaces 91, if and when, they interfere during the course of travel 100, FIG. 3, of the object 50.

As shown in FIG. 1, the whisker wheels 30 are preferably mounted on a driveshaft 100 such that the wheels are disposed in about the center of a conveyor path. An aperture 110 is provided in the center of a whisker wheel 30 for receiving a shaft 100. A wheel 30 is fixedly secured to a shaft 100 by conventional means such as by a pressure screw (not shown) or the like. As shown in FIG. 1 where a plurality of side by side conveyor paths are provided in a single framework, several wheels 30 may be mounted on a single shaft 100.

As shown in FIG. 5, an apparatus 120 which incorporates more than one row of conveyor paths in one framework in columnar arrangement such as rows 130, 140, 150 may be desirable for purposes of compactness and efficiency of use of space in the installation and handling of the delivery of large numbers of objects within a building such as a restaurant or cafeteria. Most preferably a single motor 110, FIG. 1, is provided for rotatably driving more than one shaft 100 in a single row of conveyor path(s). Typically a single motor 110 may drive 2–10 separate shafts 100, it being recognized that a single motor 110 may drive as many separate shafts as desired depending on the power of the motor 110 selected. The motor 110 may rotatably drive a shaft or shafts in an conventional manner such as by providing the ends of shaft(s) 100 with a gear and connecting the gear(s) on the end(s) of shaft(s) 100 and a master drive gear on the motor 110 with a complementary cogged belt. As is well known in the art, shaft(s) 100 may be driven at any desired rotational speed by any particular motor by the use of conventional speed control mechanisms such as speed reduction or enlargement gear mechanisms, variable electrical power delivery mechanisms and the like.

With reference to FIG. 3, as a shaft 100 is drivably rotated, a whisker wheel 30 is rotated such as in the direction shown by arrow 120, FIG. 3. As shown in FIG. 4, the whiskers 40 normally protrude a maximum distance X above the level of conveyor path 80 during the course of rotation of wheel 30. The maximum distance X is selected, inter alia, according to the bendability, resiliency and thickness of the whiskers 40. Typically the whiskers 40 are generally cylindrical and are mounted at a slight angle relative to the tangents of the points of the circumference of the wheel 30 from which the whiskers 40 protrude such that when the whiskers 40 rotate with the wheel rotation 120, the whiskers 40 are already angled in the direction in which the whiskers 40 will be further bent upon making contact with the underside surface 60 of an overlying object 50.

As best shown in FIGS. 3, 4, as an object 50 moves forwardly 100 along the conveyor path 80, the ends of the whiskers 40 on a wheel 30 underlying the object 50 will eventually engage the underside 60 of the object 50. As the wheel 30 continues to rotate the uppermost whiskers 45, FIG. 3, will bend under the weight of the object 50 and, as the whiskers 45 bend, a frictional force is created between the whiskers 45 and the surface 60. The combination of the friction between whiskers 45/surface 60 and the rotational motion 120 causes the object to be moved forwardly in the direction 100. The rate of forward movement 100 is dependent on the degree of friction between whiskers 45 and surface 60, which in turn is dependent, in part, on the bendability and resiliency of the whiskers 45 and the speed of rotation 120 of wheel 30. The thickness and the material of which the whiskers 40, 45 are comprised and the distance X are all preferably selected such that the whiskers will bend at least as much as is necessary to allow the bottom surface 60 of the object 50 to remain substantially coincident with the plane in which path 80 is disposed, i.e. the bendability, resiliency, thickness and length of the whiskers 40, 45 are all selected such that the object 50 will not be lifted off of path 80.

As can be readily imagined, when an object 50 is received at any position on and along the length of path 80, the underside surface 60 will necessarily lie above at least one wheel 30 and engage the uppermost whiskers, such as 45, FIG. 3, on at least one wheel 30. Thus, an object which is received on and along the length of a conveyor path 80 at any position will be frictionally driven forwardly 100 by at least one wheel 30. As the object 50 is driven forwardly 100, the undersurface 60 at the forward end of the moving object 50, will eventually engage the whiskers on the next wheel forward of the whisker wheel with which the surface 60 is presently engaged. Thus, in an embodiment of the invention, where all the whisker wheels are simultaneously being rotated, an object which is placed at any position along the length of the path 80 will be transported to the end of the path 80.

As discussed above, the rollers 20 are freely rotatable in either a clockwise or counterclockwise direction and are freely rotatably mounted such that when the undersurface 60 of the object 50 comes into contact with the surface 70 thereof, the rollers 20 will rotate (by virtue of frictional engagement with surface 60) and provide relatively little resistance to the forward force being exerted on the object 50 by whiskers 45.

FIGS. 1-5 illustrate a typical embodiment where the wheel(s) 30 are provided with a single row of slightly angled cylindrical whiskers 40. In such embodiments the whiskers 40 typically comprise a resilient bendable polymeric material such as a polyurethane, rubber or the like. At least the outer circumferential surface of roller 20 preferably comprises a relatively low friction material (such as a smooth surfaced polymer, metal, glass, ceramic or the like) such that a minimum of frictional resistance to forward movement 100, is created when surfaces 60 and 70 may come into contact, FIGS. 3, 4. In one exemplary embodiment of the invention, at least the outer surface of rollers 70 comprise polyvinyl chloride, the whiskers are about 0.125-0.375 inches in diameter and comprise polyurethane, the distance X is about 0.5-1.5 inches, the diameter D, FIG. 4, of wheels 30 is about 1.0-2.0 inches, the diameter W of rollers 20 is about 2.0-4.0 inches, and the whiskers 40 extend about 0.5-2.0 inches outwardly from the circumference of the wheels 30.

As can be readily imagined, the precise dimensions of the rollers 20, wheels 30, whiskers 40, as well as the relative mounting of wheels 30 to rollers 20 and the like may be varied depending on the size, weight, shape and the like of the object(s) to be conveyed by the apparatus and the speed at which the object(s) are to be conveyed. Similarly the number of whisker wheels 30 disposed at any particular transverse position across the width of a conveyor may be varied depending on similar factors concerning the object to be conveyed. Similarly the specific number and arrangement of whiskers 40 on a wheel 30 may be varied.

The degree of stiffness, bendability and resiliency of the whiskers must be at least sufficient to create enough friction between the wheels 30 and the undersurface 60 when the wheels 30 rotate such that the object will be moved forwardly at a minimum desired speed.

As shown in FIG. 1, the apparatus is provided with interference stops 200 at the end of a conveyor path. The interference stops 200 typically comprise a flange-like barrier disposed at some position across the width of the conveyor path and protruding upwardly above the plane in which the conveyor path 80 lies. When, as shown, for example, in FIG. 1, the forwardmost edge of a moving object 50 reaches the position along the length of the conveyor path 80 at which the stops 200 are disposed, the forwardmost edge of the moving object 50 engages the upwardly protruding stop(s) 200 and is prevented from moving forwardly any further by virtue of such interference engagement. As successive forwardly moving objects travel along the conveyor to the point where they engage another object which has been stopped, each successive tray is similarly stopped by virtue of interference with the stopped object. Thus in the normal operation of a conveyor apparatus, successive objects along the length of the conveyor will travel forwardly until they are stopped by interference with either an interference stop such as 200 or an object ahead which is itself stopped. In normal operation the whisker wheels are continuously driven (at least for some amount of time) even while the objects are being stopped by interference on the surface 80. Thus, when any particular stopped object among a series of successively stopped objects is removed from the conveyor path, all of the stopped objects behind the stopped object will be moved forwardly by the axial distance along the length of the conveyor path 80 which the removed object was occupying. Thus, in normal operation, all objects which are placed on the conveyor path 80 will be continuously moved to the end of the conveyor apparatus where the user can conveniently remain stationary and continuously remove objects from the apparatus.

In a typical practical application of the invention such as in a cafeteria setting, users of the cafeteria will deliver trays to a conveyor apparatus on an intermittent and unpredictable basis. Most preferably, the conveyor apparatus according to the invention includes a mechanism for sensing delivery to or receipt of an object onto the conveyor, and a mechanism connected to the sensing mechanism for actuating the drive mechanism only for so long a period of time as is necessary to insure that any object which is delivered to the conveying surface will be transported along the entire length of the conveyor path until the delivered object is stopped by interference. The sensing mechanism may, for example, comprise a conventional motion sensing detector which detects the movement of a person at or around a selected position or positions of the apparatus such as at or around one end of the apparatus where the framework is configured for allowing users to conveniently deliver objects onto the conveying surface 80, FIG. 4, of the apparatus. Alternatively, a conventional weight or pressure sensing device such as a spring loaded switch mechanism may be provided at selected positions along the conveyor path for sensing the receipt of an object onto the conveying surface. Other conventional sensing mechanisms may also be utilized.

Once a sensing mechanism has been actuated, a conventional timing mechanism preferably actuates the drive mechanism for a predetermined period of time, at the end of which, the drive mechanism is automatically turned off. The inclusion of such preferred mechanisms may therefore conserve energy and extend the useful life of the apparatus by enabling the drive mechanism to operate only when objects are actually being delivered to the apparatus and only for so long as is necessary to insure that a delivered object will travel as far along the apparatus as it may travel until it is stopped by interference. Typically, the drive actuating mechanism is programmed to actuate the drive mechanism for at least as long a period of time as would be necessary to convey an object from one terminal end of a conveying path to another terminal end, e.g. from an insert end (not shown) to a pick up end such as the end of the apparatus 10, FIG. 1, where stops 200 are disposed.

Even where sensing and timing mechanisms may be included, there will be periods of time when objects which have been placed on the conveying surface of the apparatus are eventually stopped by interference and the drive mechanism continues to operate. In order to insure that objects which are stopped on the conveying surface are not forced beyond the position at which they may be stopped by interference, the bendability, resilience and the like of the whiskers 40 and the distance X, FIG. 4, are selected such that the whiskers such as 45, FIG. 3, which may contact the underside 60 of an object 50 when stopped, will slide along the surface 60 without exerting so much frictional or upward force on the surface 60 as to result in moving the object forwardly or otherwise substantially off surface 80.

The apparatus may also include a manual override means, for overriding any time control mechanism which may be provided for actuating the drive means. Such a manual override means is typically mounted for manual availability at, for example, a pick up/removal position along the length of the conveyor apparatus such that if a user is removing objects from the apparatus and the timer mechanism has shut the drive means off, the user may conveniently actuate the drive by manually actuating the override mechanism.

It will now be apparent to those skilled in the art that other embodiments, improvements details and uses can be made consistent with the letter and spirit of the foregoing disclosure and within the scope of this patent, which is limited only by the following claims, construed in accordance with the patent law, including the doctrine of equivalents.

What is claimed is:

1. A conveyor apparatus for trays or the like comprising:
  a framework for supporting a conveyor path along which the trays are to be conveyed;
  the framework having side rails for aligning the trays in a uniform orientation along the path of the apparatus;
  a plurality of freely rotating rollers mounted on the framework between the side rails;
  the rollers being mounted on the framework in serial spaced relationship such that the uppermost tangential surfaces of successive rollers lie in a continuous plane defining a support surface for the trays;
  a plurality of wheel means mounted to the framework between the rails, the wheel means having whiskers protruding from the circumference thereof;
  the whiskers being bendable from a position in which the whiskers normally protrude from the wheel means and resiliently reformable back to the position in which the whiskers normally protrude;
  the wheel means being mounted serially along the length of the conveyor path and between the rollers such that the whiskers extend above the continuous plane in which the uppermost surfaces of the rollers lie;
  the wheel means being drivably rotatable such that the whiskers rotate and define a direction of travel for the trays; and
  the whiskers on the wheel means contacting the underside surface of a tray traveling past the wheel means and bending upon said contact, the whiskers exerting frictional force on a contacted tray and moving said contacted tray forward in the direction of travel defined by the rotatably driven wheel means.

2. The conveyor apparatus of claim 1 wherein the whiskers extend only so far above the plane in which the support surface lies so as to bend a sufficient amount upon contact with the underside of an overlying tray to create enough friction between the whiskers and the tray to move the tray forwardly upon drivable rotation of the wheel means.

3. The conveyor apparatus of claim 1 wherein the frame includes a stop mechanism disposed in the conveyor path for stopping the movement of trays by interference upon reaching a selected position along the path.

4. The conveyor apparatus of claim 3 wherein the stiffness, resiliency and bendability of the whiskers are selected to allow the whiskers to slide along the underside surface of a tray when the wheel means are drivably rotated without forcing the trays forwardly when the trays are stopped by interference along the conveyor path.

5. The conveyor apparatus of claim 1 wherein the trays are received on the supporting surface between the side rails, the trays having a certain width and being maintained substantially parallel to the axis of the conveyor path by the side rails, the wheel means being serially spaced along the length of the conveyor path such that the distance between successive wheel means is less than the width of the trays.

6. The apparatus of claim 1 further comprising:
  a drive means for rotating the wheel means; and
  means responsive to receipt of a tray on the apparatus for actuating the drive means for a predetermined period of time.

7. The apparatus of claim 6 wherein the means for actuating the drive means includes means for actuating the drive means for a period of time at least sufficient to move a tray as far along the length of the supporting apparatus as possible until the tray is stopped by interference.

8. The apparatus of claim 1 wherein the whiskers comprise a flexibly resilient polymeric material.

* * * * *